(12) United States Patent
Miller

(10) Patent No.: US 8,727,418 B2
(45) Date of Patent: May 20, 2014

(54) VEHICLE FOOTREST AND METHOD FOR PROVIDING TUNABLE FOOTREST

(75) Inventor: Ryan A. Miller, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/537,433

(22) Filed: Jun. 29, 2012

(65) Prior Publication Data

US 2014/0001787 A1 Jan. 2, 2014

(51) Int. Cl.
*B60N 3/06* (2006.01)
*B62D 25/14* (2006.01)

(52) U.S. Cl.
USPC ............ 296/75; 296/72; 297/423.1; 411/508

(58) Field of Classification Search
USPC ................... 296/197.05, 75, 1.06, 72, 97.23; 24/297, 289, 292, 293, 295, 453, 458; 280/752; 411/500, 508, 510
See application file for complete search history.

(56) References Cited

U.S. PATENT DOCUMENTS

| | | | |
|---|---|---|---|
| 2,654,420 A * | 10/1953 | Rogers | 296/75 |
| 4,176,428 A * | 12/1979 | Kimura | 24/326 |
| 6,102,466 A * | 8/2000 | Kanazawa et al. | 296/75 |
| 6,132,154 A | 10/2000 | Easter | |
| 6,220,643 B1 | 4/2001 | Kato | |
| 6,283,529 B2 | 9/2001 | Kitagawa | |
| 6,634,694 B2 * | 10/2003 | Matsushita | 296/75 |
| 6,679,544 B1 * | 1/2004 | Hubbert et al. | 296/187.05 |
| 6,910,724 B2 | 6/2005 | Kato | |
| 6,951,360 B2 | 10/2005 | Nabert et al. | |
| 7,017,978 B2 * | 3/2006 | Murakami et al. | 296/187.05 |
| 7,055,893 B2 * | 6/2006 | Yamamura et al. | 296/187.08 |
| 7,246,837 B2 | 7/2007 | Dendo et al. | |
| 2005/0029790 A1 * | 2/2005 | Dendo et al. | 280/751 |
| 2010/0230090 A1 | 9/2010 | Tubel | |

FOREIGN PATENT DOCUMENTS

| | | |
|---|---|---|
| JP | 8-164782 | 6/1996 |
| JP | 2004-345478 | 12/2004 |
| JP | 2008-80957 | 4/2008 |

* cited by examiner

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

A energy-absorbing footrest in a vehicle includes a footrest plate, a plurality of pins depending from an underside of the footrest plate, and a supporting structure defining a plurality of apertures into which the plurality of pins are received. Engagement between the plurality of pins and the supporting structure limits insertion of the plurality of pins into the apertures and thereby supports the footrest plate in an elevated position relative to the supporting structure until a predetermined force is applied to the footrest plate causing the plurality of pins to further insert into the plurality of apertures and the footrest plate to move toward the supporting structure.

21 Claims, 5 Drawing Sheets

VEHICLE FOOTREST AND METHOD FOR PROVIDING TUNABLE FOOTREST

BACKGROUND

The present disclosure generally relates to vehicle footrests, and more particularly relates to an energy-absorbing footrest in a vehicle and a method for providing a tunable footrest in a vehicle.

During a frontal vehicle crash, load can be generated along an axis of the vehicle occupant's tibia through inertia of the occupant and/or intrusion of the dash portion of the vehicle (e.g., dash lower area). To reduce this load, an energy-absorbing mechanism can be interposed between the occupant's foot and the vehicle structure on which the occupant's foot rests. Energy-absorbing vehicle footrests are generally known. Moreover, some current footrest designs can be tuned for energy absorption, however, such tuning can be difficult and particular load profiles are not easily specified.

SUMMARY

According to one aspect, an energy-absorbing footrest in a vehicle includes a footrest plate, a plurality of pins depending from an underside of the footrest plate, and a supporting structure defining a plurality of apertures into which the plurality of pins are received. Engagement between the plurality of pins and the supporting structure limits insertion of the plurality of pins into the apertures and thereby supports the footrest plate in an elevated position relative to the supporting structure until a predetermined force is applied to the footrest plate causing the plurality of pins to further insert into the plurality of apertures and the footrest plate to move toward the supporting structure.

According to another aspect, a vehicle footrest includes a footrest plate, pins projecting from an underside of the footrest plate and a supporting structure defining apertures for receiving the pins therein. Each of the pins projecting from the underside of the footrest plate is received in a corresponding one of the apertures and each of the pins is structurally configured to support the footrest plate in a first elevated position. Further, each of the pins is additionally structurally configured to forcibly project further into the corresponding aperture when a predetermined load force is applied to the footrest plate opposite the underside of the footrest plate.

According to a further aspect, a method for providing a tunable footrest in a vehicle includes providing a supporting structure with a plurality of apertures defined therein, providing a footrest plate with a plurality of pins depending from an underside thereof and securing the footrest to the supporting structure by inserting the plurality of pins into the plurality of apertures to support the footrest plate in an elevated position relative to the supporting structure.

DETAILED DESCRIPTION

Figure 1:
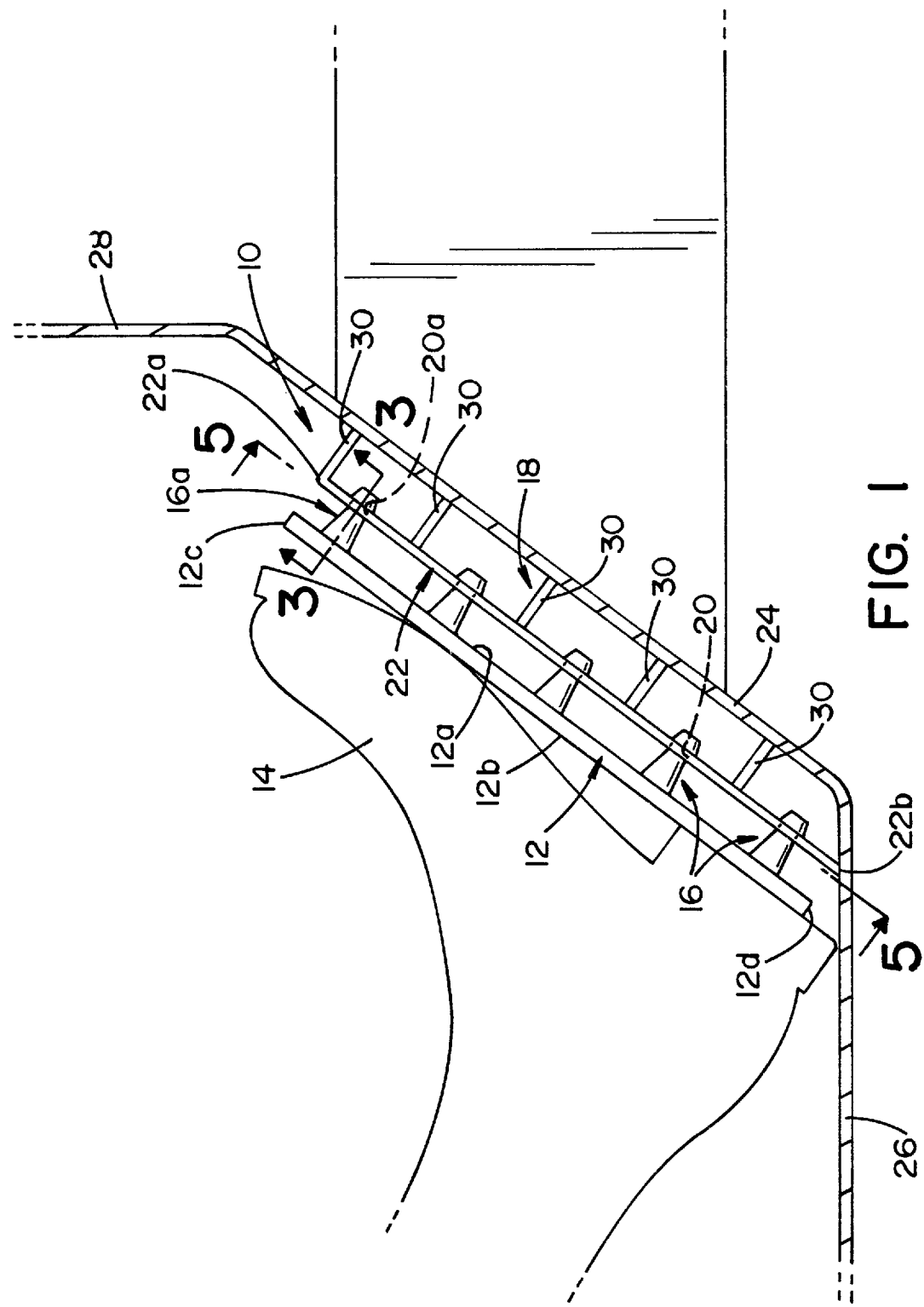
FIG. 1 is a side elevation view of an energy-absorbing footrest mounted in a vehicle, the footrest including a footrest plate, a plurality of pins and a supporting structure.
Figure 2:
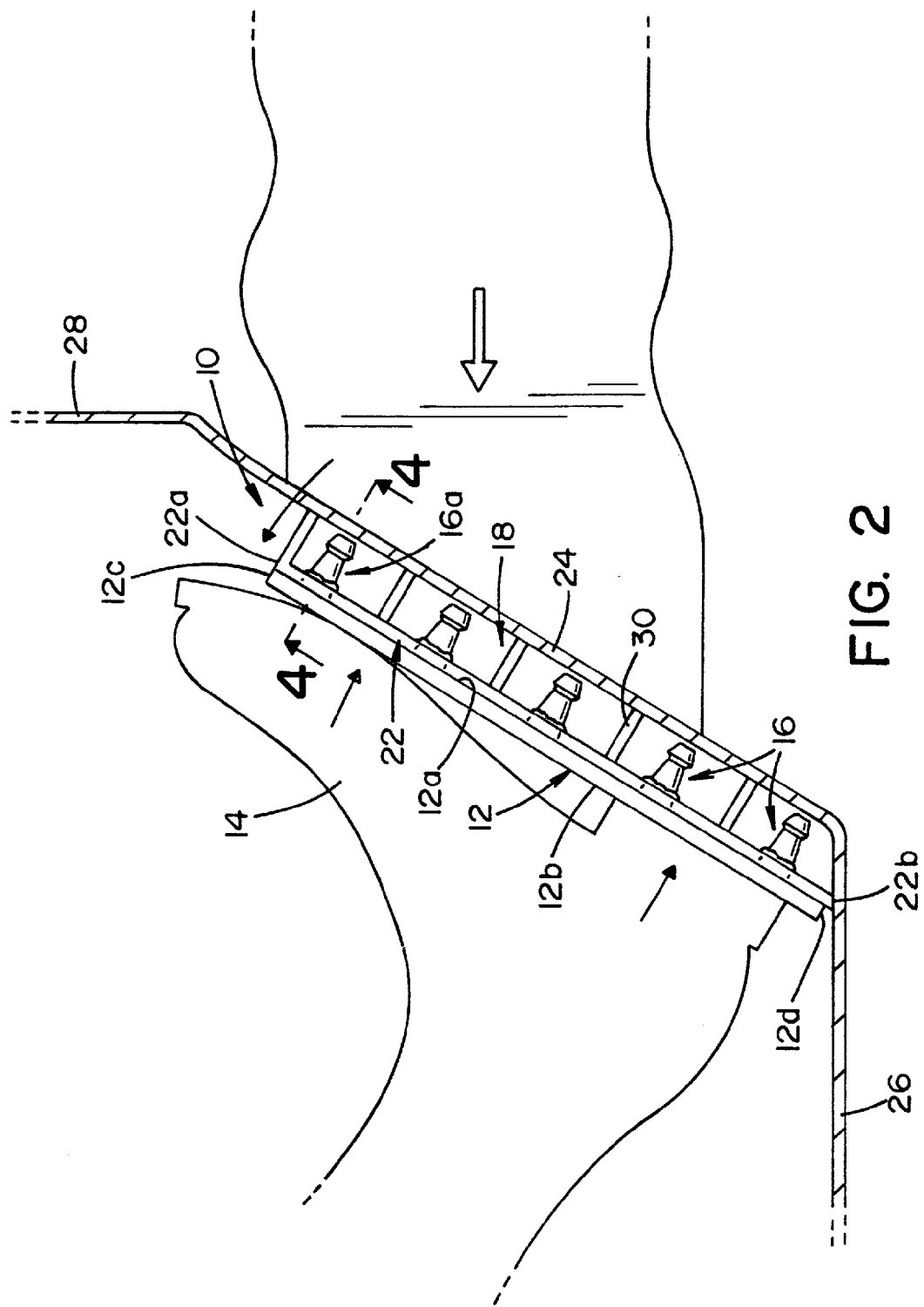
FIG. 2 is a side elevation view of the footrest of FIG. 1 shown after a force exceeding a predetermined load force is applied to the footrest plate by the illustrated foot causing the footrest plate to collapse into the supporting structure.
Figure 5:
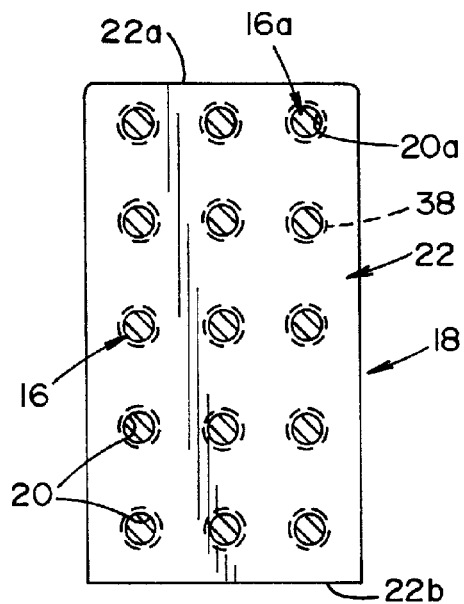
FIG. 5 is a cross-sectional view of the footrest taken through the line 5-5 of FIG. 1.

Referring now to the drawings, wherein the showings are for purposes of illustrating one or more exemplary embodiments and not for purposes of limiting same, FIGS. 1 and 2 illustrate an energy-absorbing footrest in a vehicle generally designated by reference numeral 10. The footrest 10 of the illustrated embodiment includes a footrest plate 12 on which a vehicle occupant's foot 14 can rest as shown. The footrest 10 additionally includes a plurality of pins 16 depending or projecting from an underside 12a of the footrest plate 12. The footrest 10 further includes a supporting structure 18 defining a plurality of apertures 20 (FIG. 5) for receiving the pins 16 therein.

In the illustrated embodiment, the supporting structure 18 includes a support plate 22 elevated relative to an underlying vehicle support portion 24, though this is not required and other supporting structures are contemplated (e.g., the supporting structure could simply be the vehicle floor). In the illustrated embodiment, the underlying vehicle support portion 24 is an angled portion of a vehicle floor disposed at an acute angle relative to a longitudinal length of the vehicle in which the footrest 10 is provided and extends from a main floor portion 26 that is disposed in a plane parallel to the longitudinal length of the vehicle to a dashboard panel 28 that is oriented orthogonally relative to the longitudinal length of the vehicle. The illustrated vehicle support portion 24 can also be referred to as a dash lower or dash lower member or portion and the dashboard panel 28 can be referred to as a dash upper or dash upper member. As shown, a plurality of support elements 30 can support the support plate 22 in elevated relation to the angled portion 24.

The support plate 22 into which the plurality of pins 16 is received can be configured to include a sufficient number of apertures 20 for accommodating each of the pins 16 of the footrest plate 12. As will be described in more detail below, engagement between the plurality of pins 16 and the supporting structure 18 limits insertion of the plurality of pins 16 into the apertures 20 and thereby supports the footrest plate 12 in an elevated position (i.e., the position shown in FIG. 1) relative to the supporting structure 18 until a predetermined force is applied to the footrest plate 12 causing the plurality of pins 16 to further insert into the plurality of apertures 20 and the footrest plate 12 to move toward the supporting structure 18 as illustrated in FIG. 2.

Figure 3:
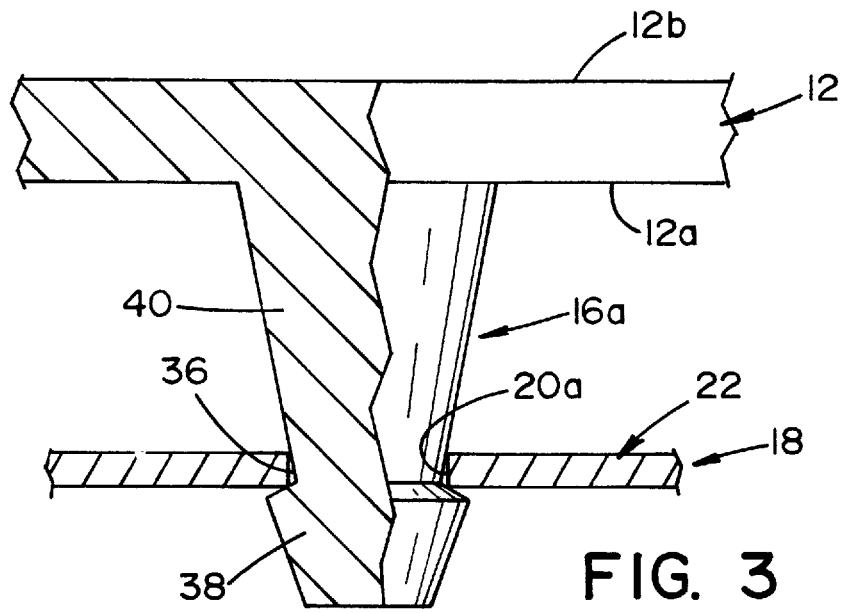
FIG. 3 is a partial cross-sectional view taken along the line 3-3 of FIG. 1 showing one of the pins of the footrest plate supporting the footrest plate in the elevated position relative to the supporting structure.

With additional reference to FIG. 3, each of the pins 16, as represented by illustrated pin 16a, projects from the underside 12a of the footrest plate 12 and is received in a corresponding one of the apertures 20, as represented by illustrated aperture 20a. As will be further described below, each of the pins 16 can be structurally configured to support the footrest plate 12 in the first elevated position shown in FIG. 1. Each of the pins 16 additionally can be structurally configured to forcibly project further into the corresponding aperture (i.e., the aperture into which the pin is received) when a predetermined load force is applied to the footrest plate 12 opposite the underside 12a of the footrest plate (i.e., when a predetermined load force is applied to an upper side 12b of the footrest plate 12). Specifically, in FIG. 3, one of the pins 16a of the plurality of pins 16 is shown received in a corresponding one 20a of the plurality of apertures 20 and an engagement between the pin 16a and the support plate 22, particularly the portion thereof defining the aperture 20a, limits insertion of the pin 16a into the aperture 20a and supports the footrest plate 12 in the elevated position of FIGS. 1 and 3.

As illustrated with respect to the pin 16a, each of the pins 16 can include a throat area or portion 36 into which the supporting structure, and particularly the support plate 22, radially projects when the footrest plate 12 is in the elevated position of FIGS. 1 and 3. The throat area 36 can have a cross-section that is smaller than a cross-section of a corresponding one of the plurality of apertures 20 into which the throat area 36 is received to support the footrest plate 12 in the elevated position. In particular, in the illustrated embodiment, the throat area 36 of the pin 16a has a diameter that is less than a diameter of the corresponding aperture 20a.

The pins 16 of the illustrated embodiment, as represented by the pin 16a in FIG. 3, each include a radially enlarged distal portion 38 and a shaft portion 40 supporting the distal portion 38 in spaced relation relative to the footrest plate 12. The throat area 36 is interposed between the distal portion 38 and the shaft portion 40. As shown, the throat area 36 can have a diameter less than that of each of the distal portion 38 and the shaft portion 40. The shaft portion 40 is interposed between the throat portion 36 and the footrest plate 12. In the illustrated embodiment, the shaft portion 40 has a cross-section that tapers from the footrest plate 12 to the throat portion 36. Accordingly, the shaft portion 40 can have a tapered profile that is reduced in diameter at or adjacent to the throat area 36 and is increased in diameter at or adjacent the footrest plate 12.

As already mentioned, the engagement between the pins 16 and the supporting structure 18 and/or the structural configuration of the pins, particularly relative to the supporting structure 18, normally supports the footrest plate 12 in the elevated position illustrated in FIGS. 1 and 3. That is, the engagement and/or structural configuration of the pins 16 maintains the footrest plate 12 in the elevated position until a predetermined force (or greater than a predetermined force) is applied to the footrest plate 12, such as by the foot 14. When such a predetermined force is applied to the footrest 12, the pins 16 are caused to further insert (i.e., further insert than are shown in FIG. 1) into the apertures 20 and the footrest plate 12 moves toward the supporting structure 18, particularly toward the support plate 22.

Figure 4:
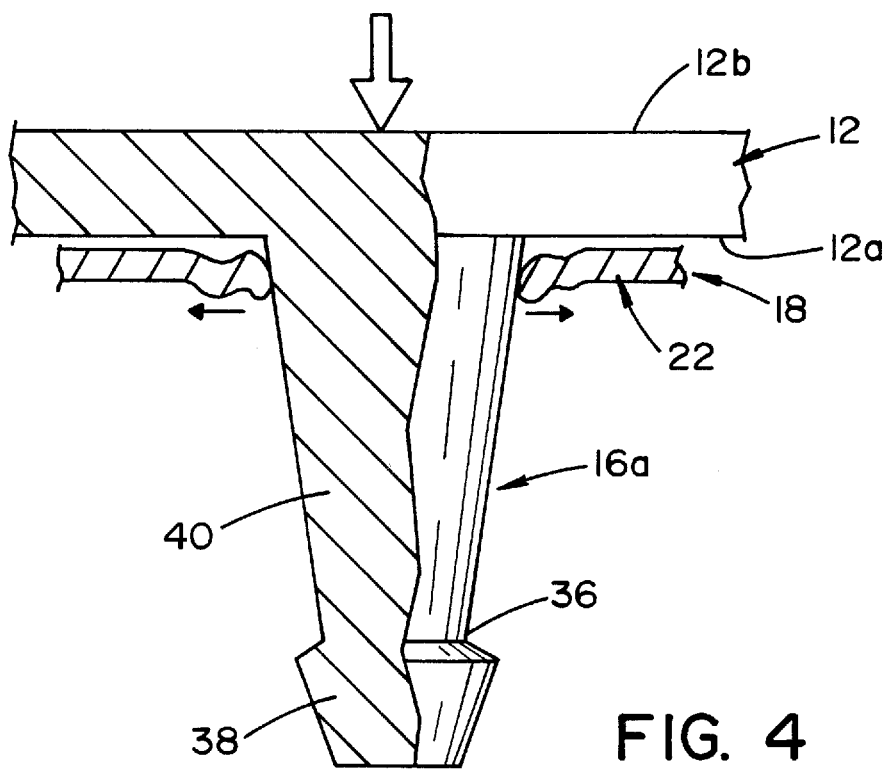
FIG. 4 is a partial cross-sectional view taken through the line 4-4 of FIG. 2 showing the same pin collapsed into the supporting structure.

More particularly, upon application of the predetermined force to the footrest plate 12, each of the pins 16 deforms the supporting structure 18, and particularly the support plate 22 thereof, adjacent the apertures 20 into which the pins 16 are received. If sufficient force is applied to the footrest plate 12, the pins 16 fully insert into the apertures 20 and the footrest plate 12 collapses onto the supporting structure 18 as shown in FIGS. 2 and 4. The rate of collapse of the footrest plate 12 toward the supporting structure 18 and thus the rate at which the pins 16 insert further into the apertures 20, particularly relative to the amount of load applied to the footrest 12, can correlate to the structural configuration and/or arrangement of the pins 16 on the underside 12a of the support plate 12. In the illustrated embodiment, and with additional reference to FIG. 5, the pins 16 can be equally dispersed or concentrated on the underside 12a of the support plate 12. That is, an approximate equal number of pins 16 per square centimeter of the support plate 12 can be provided on the entire underside 12a of the support plate 12.

In addition, in one embodiment, the structural configuration of the pins can be the same relative to one another. That is, each of the pins on the support plate 12 can be structurally configured to be identical to one another, though this is not required as discussed in further detail below. When the pins 16 are dispersed equally across the surface area of the underside 12a of the footrest plate 12 and the structural configuration of the pins 16 is unchanged from one pin to another, the performance characteristics of the footrest plate 12, particularly as relates to the amount of predetermined force necessary to cause the footrest plate 12 to collapse onto the supporting structure 18 and the pins 16 to further insert into the apertures 20, is uniform across the footrest plate 12. By way of example, the same predetermined force is required to force pin 16a located adjacent an upper edge 12c of the footrest plate, which corresponds to an upper edge 22a of the support plate, into the aperture 20a than is required to cause a pin 16 adjacent the lower edge 12d of the footrest plate 12 and the corresponding lower edge 22b of the support plate 22 to further insert into its respective aperture.

Advantageously, using pins 16 deployed across the underside 12a of the support plate 12 allows for the footrest 10 to be tuned to meet desired performance characteristics. For example, as shown by way of example in FIGS. 6 and 7, the pins 16 need not be evenly distributed about the underside 12a of the footrest plate 12. For example, the pins can include a first set of pins 46 and a second set of pins 48 and one of the first set of pins 46 or the second set of pins 48 can have a higher concentration of pins than the other of the first set of pins 46 or the second set of pins 48 for requiring a higher predetermined force to be applied to the footrest plate before the pins further insert into the plurality of apertures on the supporting structure during a crash event.

Figure 6:
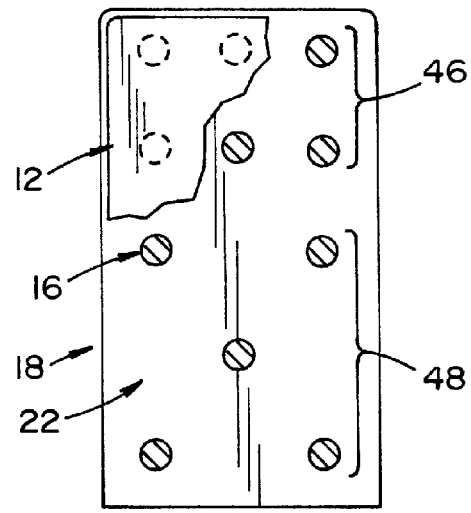
FIG. 6 is a plan view of a support plate of a supporting structure having a an alternate configuration of apertures for pins of a footrest plate.
Figure 7:
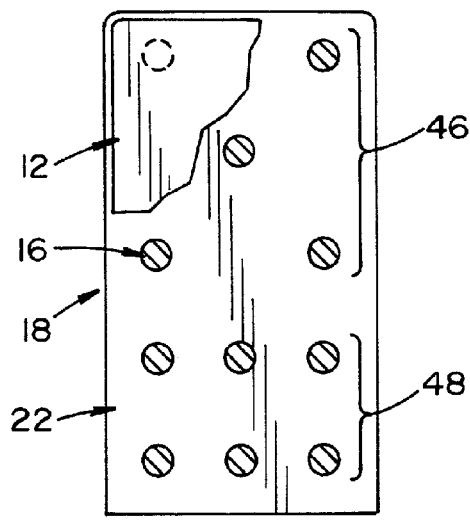
FIG. 7 is another plan view of a support plate of a supporting structure having another alternate configuration of apertures for pins of a footrest plate.

In FIG. 6, the first set of pins 46, which would be disposed near an upper edge of the footrest plate, are illustrated in a higher concentration arrangement and thus require a higher predetermined force than the second set of pins 48 before the first set of pins 46 will further insert into their respective apertures in the plate 22. In contrast, the second set of pins 48, which would be disposed near a lower edge of the footrest plate, has a lower concentration of pins across the surface area of the footrest plate and needs a lower predetermined force to cause the pins 48 to further insert into the supporting structure. As shown in FIG. 7, this can be reversed. For example, the first set of pins 46 can have the lower concentration and the second of pins 48 can have the higher concentration. It is to be appreciated by those skilled in the art that other arrangements are contemplated and should be considered within the scope of the present disclosure. For example, a higher concentration of pins could be provided in some other area of the footrest plate (e.g., adjacent a right side or a left side of the footrest plate) or more than two sets of pins can be arranged on the footrest plate.

Figure 9A:
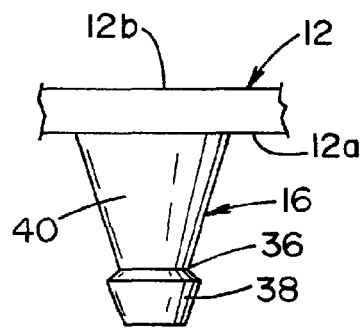
FIGS. 9A-9C are side elevation views of various pins having varying profiles for a footrest plate according to various alternate embodiments.
Figure 9B:
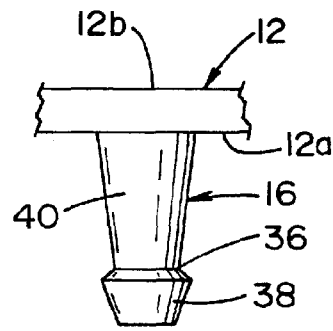
Figure 9C:
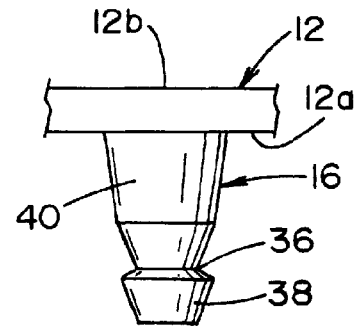

In addition or in the alternative, as illustrated in FIGS. 9A, 9B and 9C, the pins of the footrest plate 12 can have a varying configurations or profiles. In particular, the pins 16, which are disposed as all having substantially the same structural configuration, can be varied to provide different performance characteristics under application of the predetermined load to the footrest plate 12. For example, the tapering of the shaft portion 40 of each of the pins 16 can be more gradual or less gradual to provide differing performance characteristics. For example, a less gradual shaft portion (FIG. 9A) will more slowly allow the footrest plate 12 to collapse onto the supporting portion 18, and further will require continuing amounts of increasing force to be applied to the footrest plate 12 to fully insert the pins 16 into the corresponding apertures 20. In contrast, a less gradual taper on the pins (FIG. 9B), or no taper, will cause the pins to rapidly further insert into the corresponding apertures 20 and thereby cause the support plate 12 to more rapidly collapse onto the supporting structure 18. Alternately, the pins could have other profiles or structural configurations (e.g., as shown in FIG. 9C, the pins can have a configuration that marries the configurations shown in FIGS. 9A and 9B and exhibits stepped time versus load performance as described in more detail below).

In alternative configurations, the pins 16 can have varying structural configurations relative to one another. By way of example, the tapered profile of a first of the plurality of pins can be more gradual than a tapered profile of a second of the plurality of pins. For example, the pins 16 could be provided with the varying tapered shaft portions illustrated in FIGS. 9A, 9B and 9C. In FIG. 9A, the shaft portion has a significant taper that would require an increasing amount of load to be applied to the footrest plate 12 for the pin 16 to insert into its corresponding aperture. In FIG. 9B, the shaft portion has very little taper and therefore would require that much additional force to cause the pin to further insert into its corresponding aperture. In FIG. 9C, the structural configuration of the illustrated pin includes the less gradual taper of FIG. 9B adjacent the distal end and includes the more gradual taper of FIG. 9A adjacent the support plate 12 and thus performance of the pin from FIG. 9C exhibits stepped time versus load performance (see curve 64 of FIG. 10).

Figure 10:
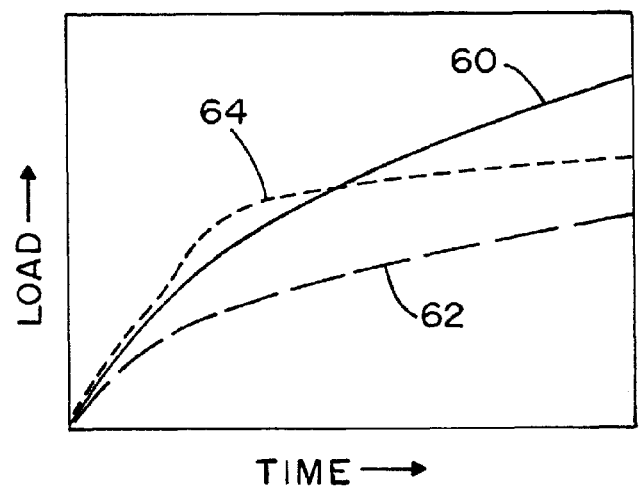
FIG. 10 is a time vs. load graph showing load performance of the pins of FIGS. 9A-9C over time.

More particularly, with reference to FIG. 10, exemplary time versus load curves are provided. In particular, a time versus load curve 60 can correspond to the pin depicted in FIG. 9A. A time versus load curve 62 can correspond to the pin depicted in FIG. 9B and a time versus load curve 64 can correspond to the pin depicted in FIG. 9C. Using pins with varying structural profiles and/or tapers can allow the footrest plate 12 to have performance characteristics that vary across the plate 12. For example, the plurality of pins on a particular footrest plate can include a first set of pins and a second set of pins, wherein at least one of the first set of pins or the second set of pins has a shape that requires a higher predetermined force to further insert the pins into corresponding ones of the plurality of apertures than required to insert the second set of pins.

Figure 8:
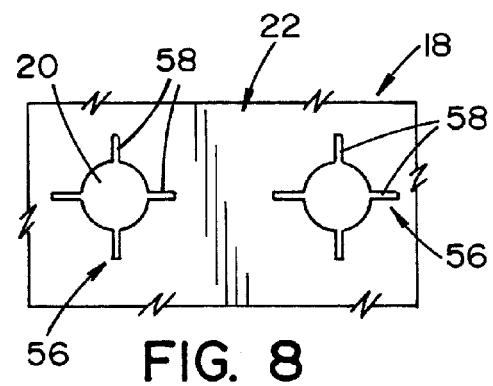
FIG. 8 is a partial plan view of a support plate of a supporting structure having apertures with additional weakened areas (e.g., circumferentially spaced slits).

With additional reference to FIG. 8, the supporting structure 18, and particularly the support plate 22 thereof, can optionally include weakened areas 56 adjacent at least some of the plurality of apertures. As shown in FIG. 8, the weakened areas can include slits 58 defined in the supporting structure and extending radially from a corresponding aperture of the plurality of apertures. As shown, in one exemplary embodiment, each of the at least some plurality of apertures includes four circumferentially spaced slits 58 extending radially outward. This inclusion of weakened areas, such as slits, can reduce the amount of the predetermined load force required to cause the pins 16 to further insert into the corresponding apertures 20.

Advantageously, the energy-absorbing footrest 10 described herein can allow for increased tunability. For example, the pins on the footrest plate 12 can be provided in varying patterns on the underside 12a of the plate 12 (e.g., the varying patterns of FIGS. 5-7). Of course, other the pins 16 could be arranged in other patterns than those illustrated herein. In addition, the structural configuration of the pins can be varied. For example, the pins on the footrest plate can have various structural configurations to provide varying performance characteristics (e.g., the structural configurations illustrated in FIGS. 9A-9C). Also, the structural configurations of the pins can vary on a given footrest plate. For example, a first set of pins could have a first pin profile and a second set of pins could have a second pin profile. Of course, the structural configurations need not be limited to those illustrated as being merely exemplary herein and more than two sets of pins could be provided having varying structural profiles. Still further, the apertures that receive the pins can be modified (e.g., weakened) to provide particular performance or tuning. It is to be appreciated by those skilled in the art that any of the foregoing options for providing tuning to the footrest can be mixed and matched (e.g., pins with different structural configurations can be used in combination with pins arranged in various patterns).

A method will now be described for providing a tunable footrest in a vehicle, such as the footrest 10 described above in reference to FIGS. 1-5. In the method, a supporting structure with a plurality of apertures defined therein can be provided, such as the supporting structure 18 having the support plate 22 with the plurality of apertures 20 defined therein. Also, a footrest plate with a plurality of pins depending from an underside thereof can be provided, such as the footrest plate 12 with the plurality of pins 16 depending therefrom. During manufacture of the footrest 10, the footrest plate 12 can secured to the supporting structure 18 by inserting the plurality of pins 16 into the plurality of apertures 20 to support the footrest plate 12 in the elevated position relative to the supporting structure. If desired, the footrest produced by this method with its plurality of pins can include arranging the pins on the underside of the footrest plate 12 to correspond to a desired load pattern and/or providing select ones of the pins on the underside of the footrest plate with varying structural configurations to correspond to a desired load pattern.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An energy absorbing footrest in a vehicle, comprising:
   a footrest plate;
   a plurality of pins depending from an underside of the footrest plate; and
   a supporting structure spaced from the footrest plate by the plurality of pins and defining a plurality of apertures into which the plurality of pins are received, engagement between the plurality of pins and the supporting structure limiting insertion of the plurality of pins into the apertures and thereby supporting the footrest plate in an elevated position relative to the supporting structure until a predetermined force is applied to the footrest plate causing the plurality of pins to further insert into the plurality of apertures and the footrest plate to move toward the supporting structure.

2. The energy absorbing footrest of claim 1 wherein each of the pins includes a throat area having a cross-section that is smaller than a cross-section of a corresponding one of the plurality of apertures into which the throat area is received to support the footrest plate in the elevated position.

3. The energy absorbing footrest of claim 2 wherein the throat area has a diameter that is less than a diameter of the corresponding aperture.

4. The energy absorbing footrest of claim 1 wherein the plurality of pins includes a first set of pins positioned adjacent a forward edge of the footrest plate and a second set of pins positioned adjacent a rearward edge of the footrest plate, one of the first set of pins or the second set of pins having a higher concentration of pins than the other of the first set of pins or the second set of pins for requiring a higher predetermined force before the pins further insert into the plurality of apertures during a crash event.

5. The energy absorbing footrest of claim 4 wherein the first set of pins has the higher concentration of pins than the second set of pins.

6. The energy absorbing footrest of claim 4 wherein the second set of pins has the higher concentration of pins than the first set of pins.

7. The energy absorbing footrest of claim 1 wherein the supporting structure includes a support plate elevated relative to an underlying vehicle support portion.

8. The energy absorbing footrest of claim 7 wherein the vehicle support portion is an angled portion disposed at an acute angle relative to a longitudinal length of the vehicle and extending from a main floor portion that is disposed in a plane parallel to the longitudinal length to a dashboard panel that is oriented orthogonally relative to the longitudinal length, a plurality of support elements supporting the support plate in elevated relation relative to the angled portion.

9. The energy absorbing footrest of claim 1 wherein each of the plurality of pins includes a radially enlarged distal portion, a shaft portion supporting the distal portion in spaced relation relative to the footrest plate and a throat area interposed between the distal portion and the shaft portion, the throat area having a diameter that is less than that of each the distal portion and the shaft portion.

10. The energy absorbing footrest of claim 9 wherein the shaft portion has a tapered profile that is reduced in diameter at or adjacent the throat area and is increased in diameter at or adjacent the footrest plate.

11. The energy absorbing footrest of claim 9 wherein the tapered profile of a first of the plurality of pins is more gradual than the tapered profile of a second of the plurality of pins.

12. The energy absorbing footrest of claim 1 wherein the plurality of pins includes a first set of pins and a second set of pins, one of the first set of pins or the second set of pins having a shape requiring a higher predetermined force to further insert the pins into corresponding ones of the plurality of apertures than required to further insert the second set of pins.

13. The energy absorbing footrest of claim 1 wherein the supporting structure includes weakened areas adjacent at least some of the plurality of apertures.

14. The energy absorbing footrest of claim 13 wherein the weakened areas include slits defined in the supporting structure and extending radially from a corresponding aperture of the plurality of apertures.

15. The energy absorbing footrest of claim 14 wherein each of the at least some of the plurality of apertures includes four circumferentially spaced slits extending radially outward.

16. A vehicle footrest, comprising:
   a footrest plate;
   pins formed with the footrest plate and projecting from an underside of the footrest plate; and
   a supporting structure defining apertures for receiving the pins therein,
   wherein each of the pins projecting from the underside of the footrest plate is received in a corresponding one of the apertures, each of the pins structurally configured to support the footrest plate in a first elevated position, each of the pins additionally structurally configured to forcibly project further into the corresponding aperture when a predetermined load force is applied to the footrest plate opposite the underside of the footrest plate.

17. The vehicle footrest of claim 16 wherein each of the pins deforms the supporting structure adjacent the corresponding aperture when the predetermined load force is applied.

18. The vehicle footrest of claim 16 wherein each of the pins includes a throat portion into which the supporting structure radially projects when the footrest plate is in the first elevated position.

19. The vehicle footrest of claim 17 wherein each of the pins includes a shaft portion interposed between the throat portion and the footrest plate, the shaft portion having a cross-section that tapers from the footrest plate to the throat portion.

20. A method for providing a tunable footrest in a vehicle, comprising:
   providing a supporting structure with a plurality of apertures defined therein;
   providing a footrest plate with a plurality of pins depending from an underside thereof and spacing the footrest plate from the supporting structure via the plurality of pins; and
   securing the footrest plate to the supporting structure by inserting the plurality of pins into the plurality of apertures to support the foot rest plate in an elevated position relative to the supporting structure.

21. The method of claim 20 wherein providing the footrest plate with the plurality of pins includes at least one of arranging the pins on the underside of the footrest plate 12 to correspond to a desired load pattern and/or providing select ones of the pins on the underside of the footrest plate with varying structural configurations to correspond to a desired load pattern.

* * * * *